US006442892B1

(12) United States Patent
Azoulay

(10) Patent No.: US 6,442,892 B1
(45) Date of Patent: Sep. 3, 2002

(54) AUTOMATIC SPROUTER SYSTEM

(76) Inventor: Sidney S. Azoulay, 803 Vassar Dr. SE., Albuquerque, NM (US) 87106

( * ) Notice: Subject to any disclaimer, the term of this patent is extended or adjusted under 35 U.S.C. 154(b) by 0 days.

(21) Appl. No.: 09/565,889

(22) Filed: May 5, 2000

(51) Int. Cl.[7] .................................... A01G 31/00
(52) U.S. Cl. .................................... 47/61
(58) Field of Search .................................... 47/14, 16, 61

(56) References Cited

U.S. PATENT DOCUMENTS

| | | | | |
|---|---|---|---|---|
| 3,108,400 A | | 10/1963 | Wolfe, Jr. | |
| 3,542,069 A | | 11/1970 | Ollison | |
| 4,107,874 A | | 8/1978 | Richardson | |
| 4,135,331 A | | 1/1979 | Lamlee | |
| 4,144,671 A | | 3/1979 | Lee | |
| 4,177,604 A | | 12/1979 | Friesen | |
| 4,180,941 A | | 1/1980 | Korematsu | |
| 4,439,949 A | * | 4/1984 | Ocko | 47/61 |
| 4,447,983 A | | 5/1984 | Shinada | |
| 4,471,572 A | | 9/1984 | Young | |
| 4,787,172 A | * | 11/1988 | Lee | 47/16 |
| 4,951,416 A | | 8/1990 | Gutridge | |
| 4,989,367 A | | 2/1991 | Chung | |
| 5,025,589 A | | 6/1991 | Park | |
| 5,042,195 A | | 8/1991 | Lee et al. | |
| 5,094,030 A | | 3/1992 | Chia et al. | |
| 5,191,982 A | * | 3/1993 | Tong | 209/17 |
| 5,251,399 A | | 10/1993 | Rasmussen | |

* cited by examiner

*Primary Examiner*—Charles T. Jordan
*Assistant Examiner*—Francis T. Palo
(74) *Attorney, Agent, or Firm*—Frank J. McGue

(57) ABSTRACT

An automatic sprouter apparatus is disclosed which comprises a housing having an interior divided into a plant compartment and a water compartment. The plant compartment has a porous horizontal divider adapted to allow plants to rest thereon and water to drain therethrough. The water compartment is divided into an upper space having a floor, a water reservoir containing water positioned below the hardware space and a mixing area interposed between water reservoir and hardware space with the floor forming the top of the mixing area. The floor has a plurality of holes therethrough which provides gaseous communication between the mixing area and the hardware space. The sides and the bottom of the mixing area are formed of a screen. A mist generator is mounted to the floor and has a motor with a shaft extending downwardly therefrom. A hollow tapered shaft, open at both upper and lower ends, is mounted on the shaft and extends downwardly therefrom through the mixing area and into the water reservoir. The shaft is tapered from a wide portion at the top to a narrower portion below whereby when the shaft is spinning rapidly, the combination of centripetal force on the water and the outwardly sloping inner surface of the tapered shaft forces water upwardly therein. A disk is mounted atop the open upper end of the tapered shaft and adapted to receive water therefrom. The disk throws the water off in a radial movement in small droplets in the mixing area and also forces air within the mixing area outwardly throughout the mixing area. This action mixes the air and the water within the mixing area and forces the resultant mixture through the screen to the plant compartment in a fine mist.

8 Claims, 5 Drawing Sheets

AUTOMATIC SPROUTER SYSTEM

TECHNICAL FIELD

This invention relates to sprouter systems, and, more particularly, automatic sprouter systems adapted to provide automated soaking, rinsing, draining, misting and oxygenation of seeds and grains until ready for harvest.

BACKGROUND OF THE INVENTION

It has been demonstrated recently that the nutritional value of seeds increases dramatically during the first few days after sprouting. Such sprouts have been found to be very palatable snacks and additions to such foods as soups, salads, vegetable dishes, sandwiches, omelets, breads and beverages in addition to being used as simple garnishes. Sprouts also tend to be economical since one half cup of seeds may expand to one and one half cups after soaking and to about a quart of edibles after sprouting. Many people are now growing sprouts from such seeds and grains as buckwheat, hard winter wheat, alfalfa, mung beans, lentils, chick-peas, watercress, and sunflower. Hereafter, the word 'seed' is defined to include beans, grains and any other ovules from which plants are grown.

There are a number of devices conceived to assist growers, both home growers as well as commercial growers, to better automate and control sprouting seeds.

U.S. Pat. No. 4,144,671 entitled "Apparatus for Growing Bean Sprouts" which issued on May 20, 1979 to Lee discloses a self watering apparatus including a housing divided into an upper and a lower compartment by a horizontal divider plate having orifices therethrough. A tilting water container is used to periodically supply water to plants in the upper compartment.

U.S. Pat. No. 4,989,367 entitled "Method and Apparatus for Germinating Seed Sprouts" which issued on Feb. 5, 1991 to Chung discloses accelerated sprouting of bean sprouts by placing said sprouts in a closed vessel on a screen. The seeds are soaked with water and additives and humidified air is blown through at periodic intervals.

U.S. Pat. No. 5,025,589 entitled "Methods and Apparatus for Growing Bean Sprouts" which issued on Jun. 25, 1991 to Park discloses a series of vertical beds having bean sprouts growing therein organized in order of size with the largest at the top. Water cascades downward through the beds at periodic intervals.

However, there is still a need for an apparatus for use by the home owner or small commercial concern which is fully automatic until harvest with no human touch. In addition, at present most seed sprouting methods require a 12 to 24 hour pre-soaking period before initiation. It would be desirable to eliminate this pre-soaking step. Lastly, the use of hydroponic techniques to avoid the use of soil and resultant contamination is preferred. The present invention meets this need.

In addition, the prior art teaches that water with some air circulation provides the best combination for sprouts. However, new research indicates that maximizing the air with a minimum amount of water makes for better sprouts with a minimal risk of contamination by molds and the like.

None of the known prior art disclose the device set forth herein.

SUMMARY OF THE INVENTION

It is an object of this invention to provide a simple, easy to use fully automated seed sprouting apparatus to minimize handling and maximize hygiene.

It is a further object of this invention to provide a fully automated seed sprouting apparatus using hydroponic technology which minimizes the risk of mold or rotting by providing air under pressure with a water mist.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
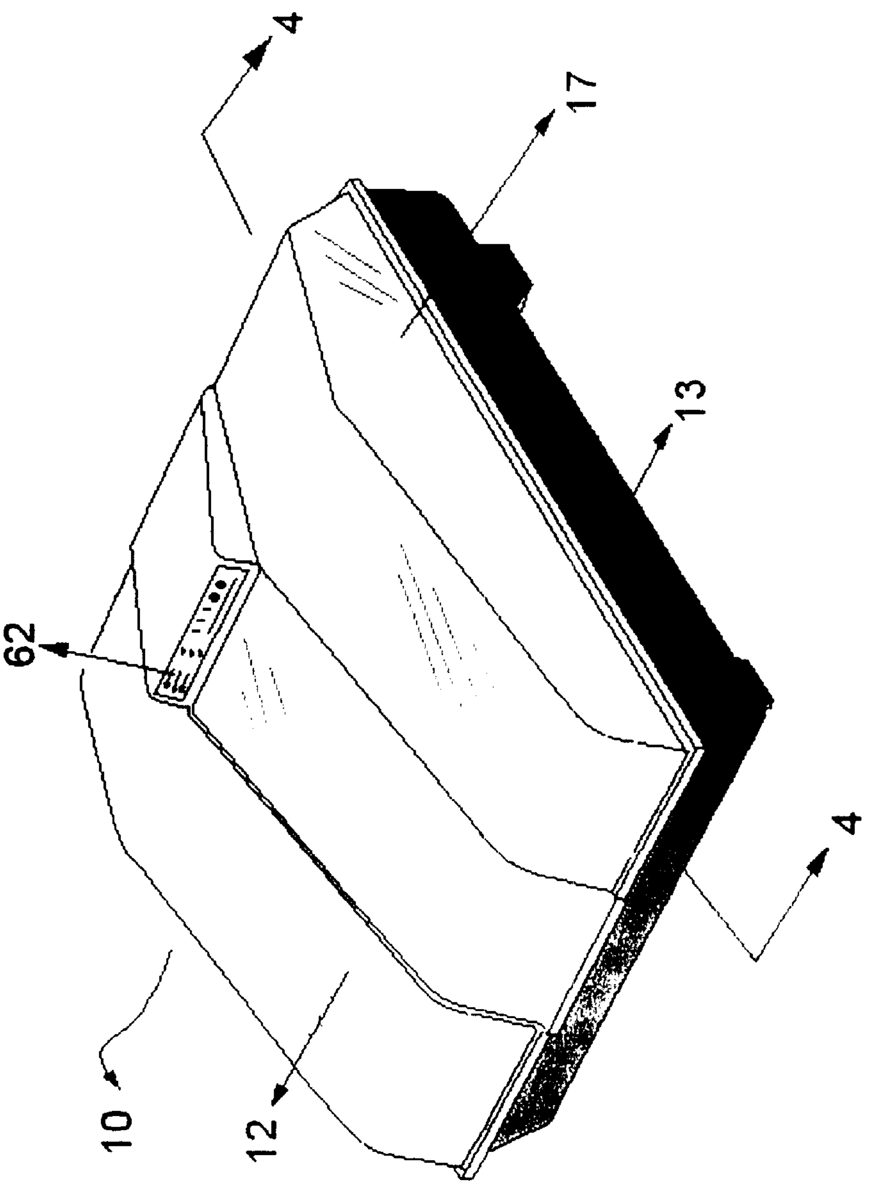
FIG. 1 is a front and side perspective view of the present invention.
Figure 2:
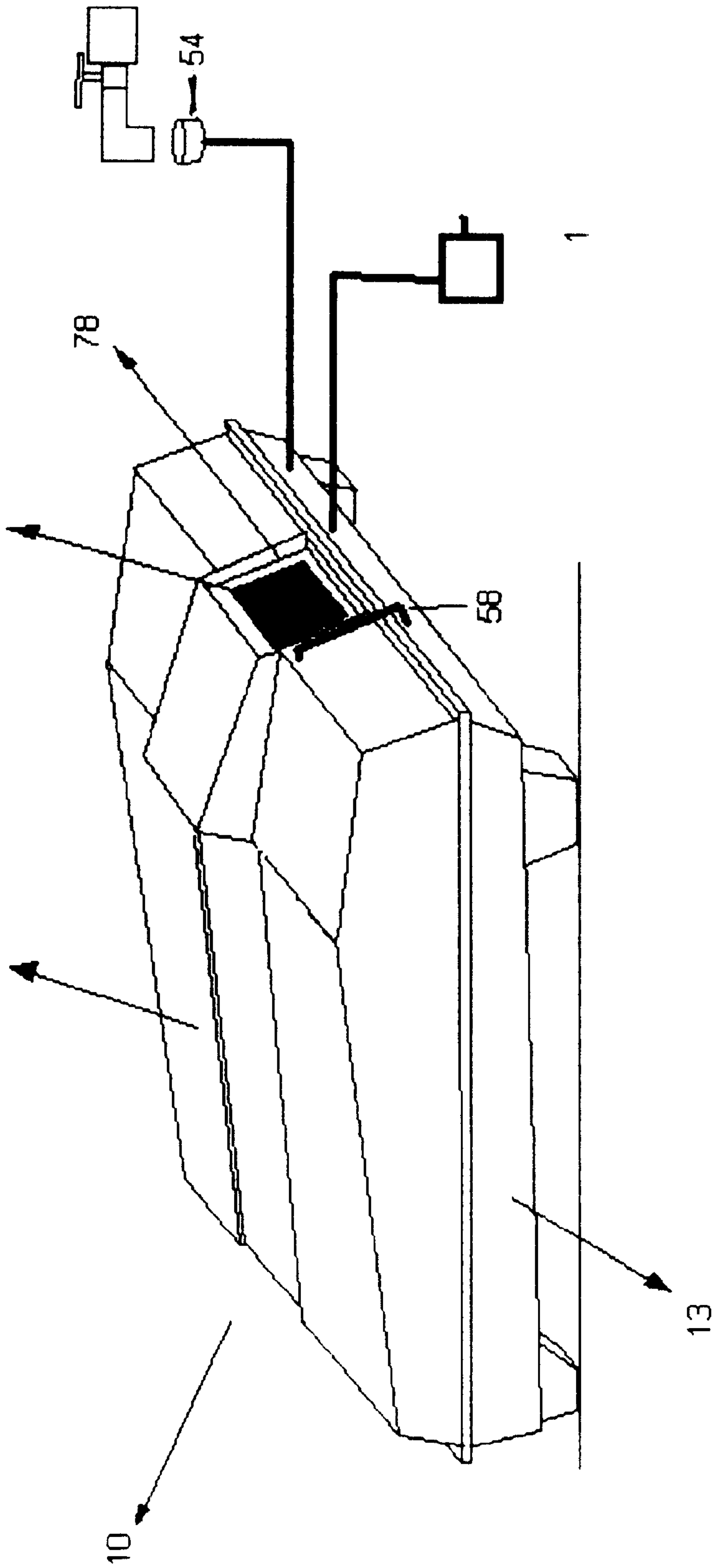
FIG. 2 is a rear and side perspective view of the present invention.
Figure 3:
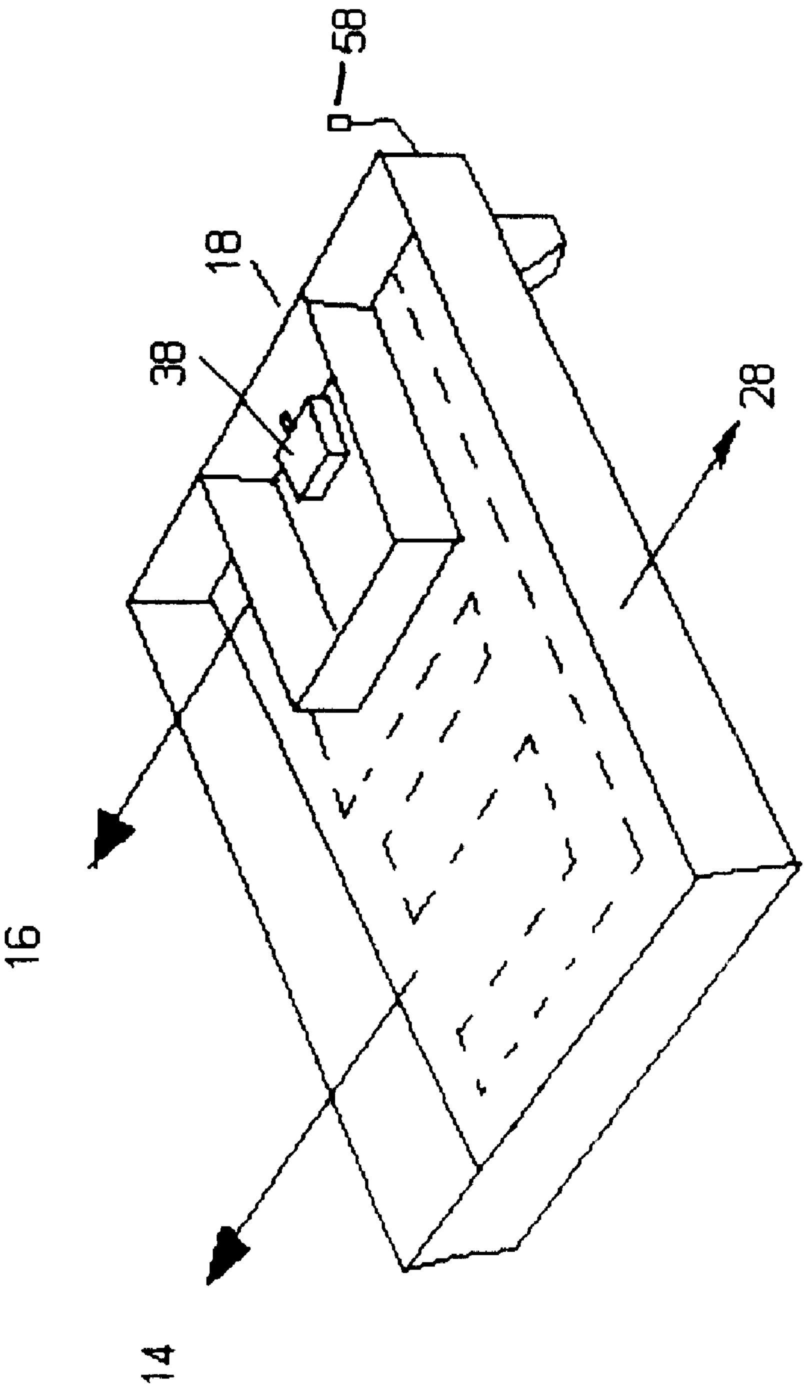
FIG. 3 is a top plan view of the base of the present invention.

Referring more particularly to the drawings by characters of reference, FIGS. 1–5 disclose an automatic sprouter apparatus 10 comprising a housing 11 having, preferably, a cover 12 mounted to a base 13. As best seen in FIG. 3, the interior of housing 11 is divided into a plant compartment 14 and a water compartment 16. In the presently preferred embodiment, housing 11 is a generally box-like structure with water compartment 16 abutting a rear wall 18 thereof and extending into housing 11. The remaining portion of the interior of housing 11 comprises the larger plant compartment 14 which abuts water compartment 16 on three sides thereof.

Those skilled in the art will recognize that the exact shapes and sizes of housing 11, plant compartment 14 and water compartment 16 are matters of design choice.

Figure 4:
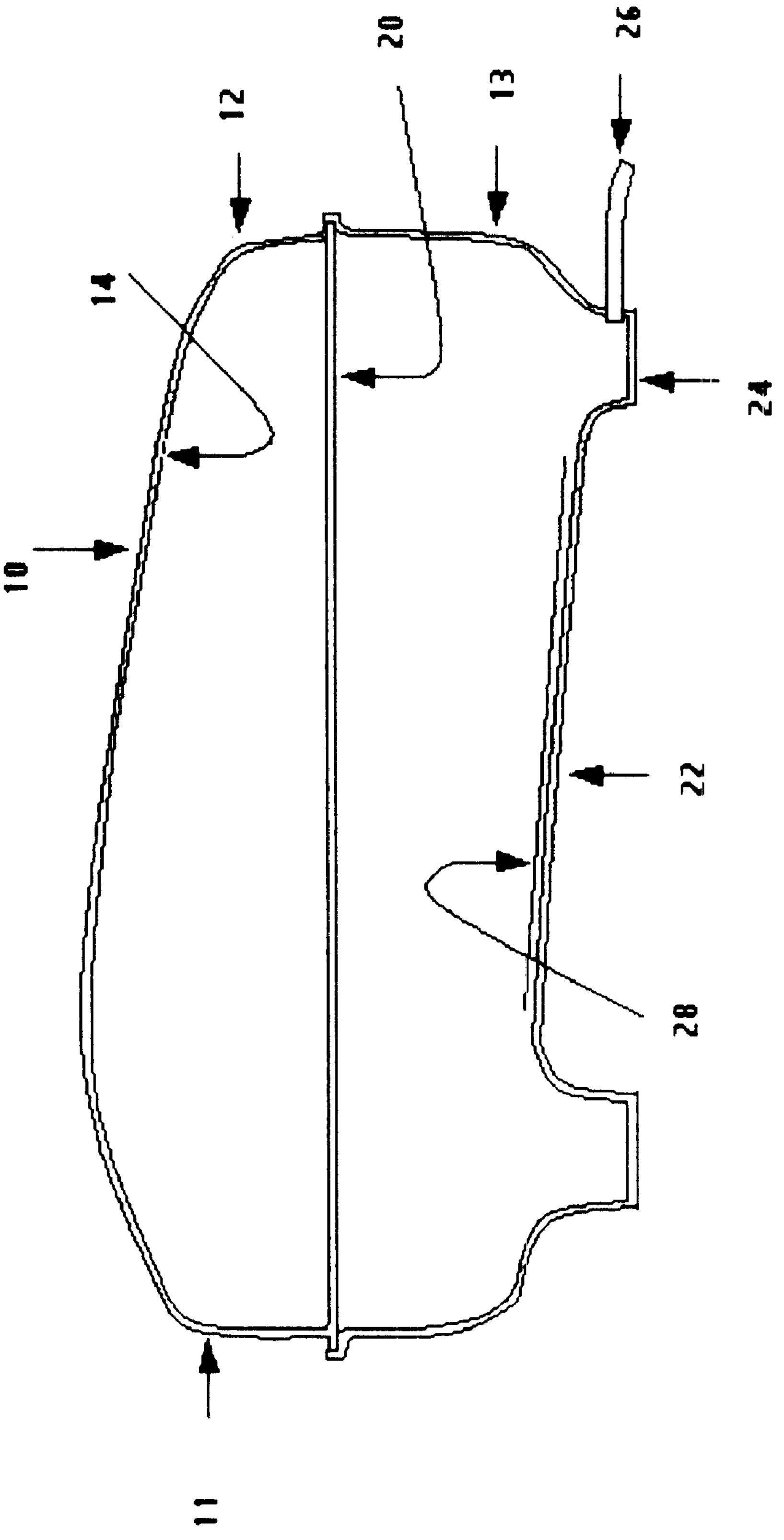
FIG. 4 is a cross sectional view of FIG. 1 taken along line 4—4.

Turning now to FIG. 4, plant compartment 14 includes a porous horizontal divider 20 upon which plants in pots or the like (not shown) rest. Mist drops through divider 20 to encounter sloped bottom 22 which directs that water into hollow legs 24. Legs 24 are provided with a drainage hose 26 providing liquid communication between the interior and exterior of housing 11. Drainage hose 26 removes excess water from apparatus 10. In addition, heating elements 28 extend across bottom 22 thereby providing a heat source to maintain apparatus 10 at a desired temperature.

Figure 5:
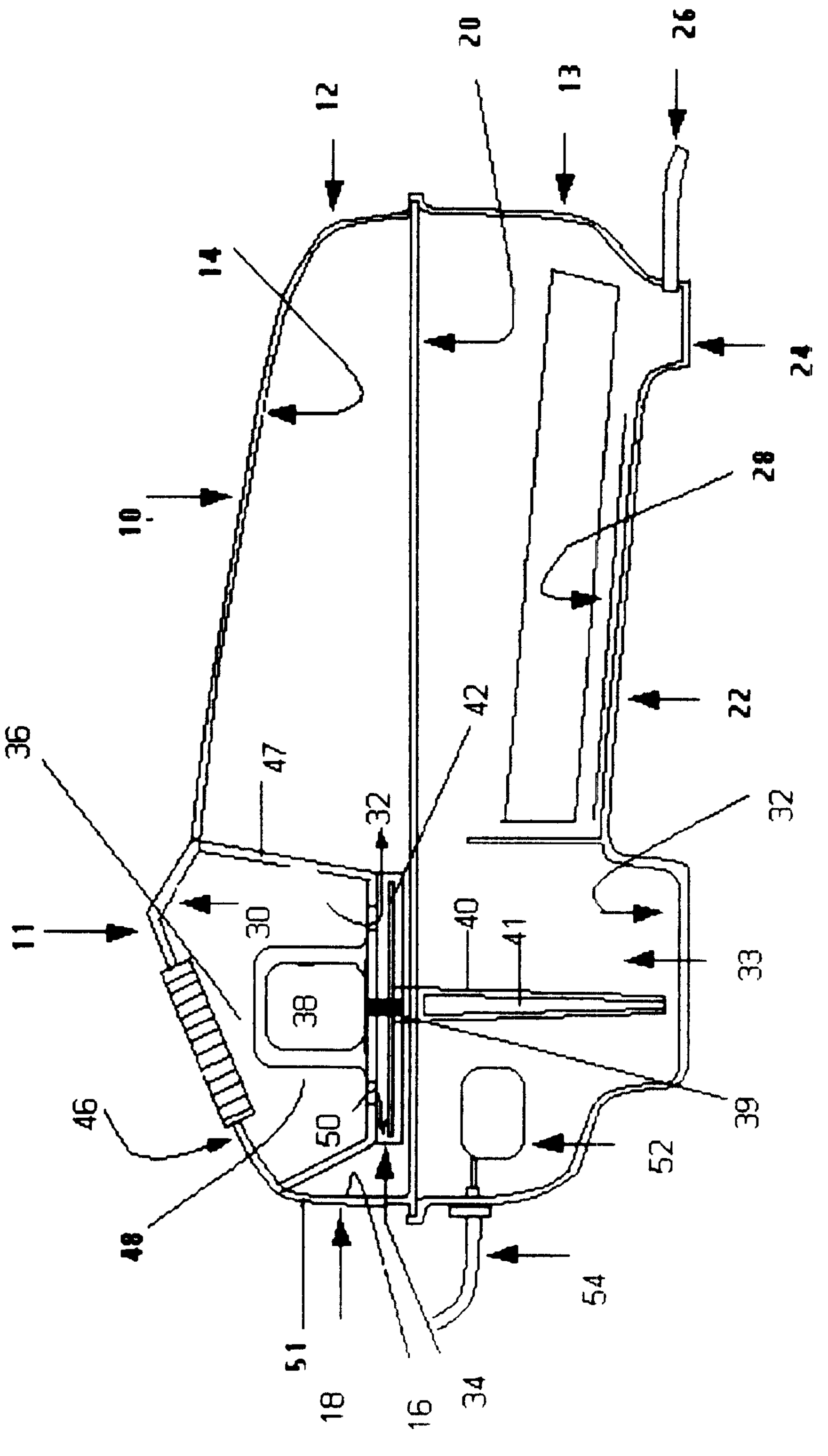
FIG. 5 is a cross sectional view of FIG. 1 taken along line 5—5.

Turning now to FIG. 5, water compartment 16 is divided into an upper hardware space 30 having a floor 31, a water reservoir 32 containing water 33 positioned below the hardware space and a mixing area 34 interposed between water reservoir 32 and hardware space 30, floor 31 forming the top of the mixing area 34. The sides and bottom of mixing area 34 are formed of a screen 35.

A mist generator 36 includes a motor 38 is mounted on floor 31 within the upper hardware space 30 and has a power shaft 39 extending downwardly therefrom. A hollow tapered shaft 40, open at both its upper and lower ends, is mounted on shaft 39 and extends downwardly from motor 38 through mixing area 34 and into water 33. Shaft 40 is tapered from a wide portion at the top to a narrower portion below. When shaft 40 is spinning rapidly, the combination of centripetal force on the water and the outwardly sloping inner surface of tapered shaft 40 forces water upwardly therein as shown by arrows 41. The amount of water 33 lifted by shaft 40 is dependent upon the diameter and length of shaft 40 and the rotational speed thereof.

Mounted atop the open upper end of shaft 40 is a disk 42. The open upper end of shaft 40 directs water 33 onto disk 42 as shown by arrows 41. The spinning disk 42 throws the water off in a radial movement in small droplets in mixing area 34. In addition, spinning disk 42 forces air within mixing area 34 outwardly throughout mixing area 34 thereby thoroughly mixing the air and water within mixing area 34 which is thereafter forced through screen 35 to plant compartment 14 in a fine mist. The fineness of the mist particles is dependent upon the mesh size of screen 35 as well as the rotational speed of disk 42. The air forced through screen 35 is replaced by air coming through holes 44 situated in floor 31 of hardware space 30. To ensure clean air, upper hardware space 30 further includes cover 46 and sidewalls 47. An air passage 48 connecting hardware space 30 with the exterior is provided with an air filter 51 to capture contaminants prior to entry into the system. The path of the air from air passage 48 into hardware space 30 through holes 44 and mixing area 34 is denoted by arrows 50.

The action of mist generator 36 provides for an increase in air pressure within plant compartment 14 when operating. The pressurization acts to oxygenate water 33 and provides more air (oxygen) and water to the sprouting seeds. This also results in a coolant effect to offset the heat generated by the sprouting itself.

The water level in reservoir 32 is maintained using a float valve 52 attached to a source of water 54 such as a faucet illustrated in FIG. 2. In addition, electrical power for motor 38 is provided by a source of electrical power such as a standard ac plug 56 or a DC source also seen in FIG. 2. Plug 56 also supplies power to heating elements 28 when activated by thermocouple 58.

As best seen in FIG. 1, a control panel 62 is mounted on the exterior of housing 11. Panel 62 includes such basis elements as an on/off switch, a thermocouple on/off switch and temperature control dial, a rheostat or other speed control mechanism for motor 38, gauges for determining humidity and temperature within, a timer for controlling the cycles.

Although only certain embodiments have been illustrated and described, it will be apparent to those skilled in the art that various changes and modifications may be made therein without departing from the spirit of the invention or from the scope of the appended claims.

What is claimed is:

1. An automatic sprouter apparatus comprises a housing having an interior divided into a plant compartment and a water compartment, the plant compartment having a porous horizontal divider adapted to allow plants to rest thereon and water to drain therethrough, the water compartment being divided into an upper space having a floor and a hardware space, a water reservoir containing water positioned below the hardware space and a mixing area having sides and a bottom interposed between the water reservoir and hardware space, the floor forming the top of the mixing area, the floor having a plurality of holes therethrough providing gaseous communication between the mixing area and the hardware space, the sides and the bottom of the mixing area being formed of a screen, a mist generator having a motor with a shaft extending downwardly therefrom being mounted on the floor, a hollow tapered shaft with open upper and lower ends, being mounted on the motor shaft and extending downwardly therefrom through the mixing area and into the water reservoir, the hollow tapered shaft being tapered from a wide portion at the top to a narrower portion below whereby when the hollow tapered shaft is spinning rapidly, the combination of centripetal force on the water and the outwardly sloping inner surface of the hollow tapered shaft forces water upwardly therein, a disk being mounted atop the open upper end of the hollow tapered shaft and adapted to receive water therefrom, the disk throwing the water off in a radial movement in small droplets in the mixing area, the disk forcing air within the mixing area outwardly throughout the mixing area thereby mixing the air and the water within the mixing area and forcing the mixture through the screen to the plant compartment in a fine mist.

2. The automatic sprouter apparatus of claim 1 wherein air forced through the screen is replaced by air coming through the plurality of holes situated in the floor, the air from the hardware space being replaced by air from an air passage connecting the hardware space to the exterior of the housing.

3. The automatic sprouter apparatus of claim 2 wherein an air filter is mounted within the air passage.

4. The automatic sprouter apparatus of claim 1 wherein the housing is a generally box-like structure with the water compartment abutting a rear wall thereof and extending into the housing, and the remaining portion of the housing comprises the plant compartment which abuts the water compartment on three sides thereof.

5. The automatic sprouter apparatus of claim 1 wherein the plant compartment has a sloped bottom which directs water falling through the porous horizontal divider into a plurality of hollow legs, each of the plurality of hollow legs having a drainage hose providing liquid communication between the interior and exterior of the housing.

6. The automatic sprouter apparatus of claim 1 further comprising heating elements thereby maintaining a desired temperature within the housing.

7. The automatic sprouter apparatus of claim 1 wherein the water level in the water reservoir is maintained using a float valve operatively attached to a source of water.

8. An automatic sprouter apparatus comprises a housing having an interior divided into a plant compartment and a water compartment, the housing being a box-like structure with the water compartment abutting a rear wall thereof and extending into the housing, and the remaining portion of the housing comprises the plant compartment which abuts the water compartment on three sides thereof, the plant compartment having a porous horizontal divider adapted to allow plants to rest thereon and water to drain therethrough and sloped bottom which directs water falling through the porous horizontal divider into a plurality of hollow legs, each of the plurality of hollow legs having a drainage hose providing liquid communication between the interior and exterior of the housing, the plant compartment further having heating elements thereby maintaining a desired temperature within the housing, the water compartment being divided into an upper space having a floor and a hardware space, a water reservoir containing water positioned below the hardware space and a mixing area having sides and a bottom interposed between the water reservoir and hardware space, the floor forming the top of the mixing area, the floor having a plurality of holes therethrough providing gaseous communication between the mixing area and the hardware space, the sides and the bottom of the mixing area being formed of a screen, the water level in the water reservoir being maintained by a float valve operatively attached to a source of water, a mist generator having a motor with a shaft extending downwardly therefrom being mounted on the floor, a hollow tapered shaft, with open upper and lower ends, being mounted on the motor shaft and extending downwardly therefrom through the mixing area and into the water reservoir, the hollow tapered shaft being tapered from a wide portion at the top to a narrower portion below whereby when the hollow tapered shaft is spinning rapidly, the combination of centripetal force on the water and the outwardly sloping inner surface of the hollow tapered shaft forces water upwardly therein, a disk being mounted atop the open upper end of the hollow tapered shaft and adapted to receive water therefrom, the disk throwing the water off in a radial movement in small droplets in the mixing area, the disk forcing air within the mixing area outwardly throughout the mixing area thereby mixing the air and the water within the mixing area and forcing the mixture through the screen to the plant compartment in a fine mist, the air being forced through the screen being replaced by air coming through the plurality of holes situated in the floor, the air from the hardware space being replaced by air from an air passage connecting the hardware space to the exterior of the housing, an air filter being mounted within the air passage.

* * * * *